(12) United States Patent
Errigo et al.

(10) Patent No.: US 7,552,145 B1
(45) Date of Patent: Jun. 23, 2009

(54) METHOD AND SYSTEM OF RESTATING TELECOMMUNICATIONS DATA BY A BATCH-DRIVEN INTEGRATED RULES MODULE

(75) Inventors: Robin Ranee Errigo, Shawnee, KS (US); Steven Eugene Pence, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 291 days.

(21) Appl. No.: 11/364,430

(22) Filed: Feb. 28, 2006

(51) Int. Cl.
*G06F 17/30* (2006.01)
(52) U.S. Cl. .................... 707/200; 707/102
(58) Field of Classification Search .............. None
See application file for complete search history.

(56) References Cited

U.S. PATENT DOCUMENTS

| | | | | |
|---|---|---|---|---|
| 6,161,103 | A * | 12/2000 | Rauer et al. | 707/4 |
| 6,668,253 | B1 * | 12/2003 | Thompson et al. | 707/10 |
| 6,789,096 | B2 * | 9/2004 | Sankaran et al. | 707/203 |
| 6,839,716 | B1 * | 1/2005 | Della-Libera et al. | 707/103 R |
| 7,315,849 | B2 * | 1/2008 | Bakalash et al. | 707/2 |
| 2002/0138316 | A1 * | 9/2002 | Katz et al. | 705/7 |

OTHER PUBLICATIONS

Schuman, "At Wal-Mart, Worlds Largest Retail Data Warehouse Gets Even Larger" (http://www.eweek.com/c/a/Retail/At-WalMart-Worlds-Largest-Retail-Data-Warehouse-Gets-Even-Larger/), Oct. 13, 2004, 1-2.*
Guide, "Oracle 9i Data Warehousing Guide, Release 2 (9.2)" (http://download-uk.oracle.com/docs/cd/B10501_01/server.920/a96520/title.htm), Mar. 1, 2002, 1-11.*

* cited by examiner

*Primary Examiner*—John E Breene
*Assistant Examiner*—Aleksandr Kerzhner

(57) ABSTRACT

One exemplary method of restating telecommunications data by a batch-driven integrated rules module can include receiving batched client data for transforming and loading into a database warehouse to create legacy client data. The method may also include selecting criteria for restating data from a GUI, communicating the criteria to the batch-driven integrated rules module, generating a script based on the communicated criteria for extracting data from the data warehouse that generally includes the legacy client data, extracting the legacy client data from the data warehouse, queuing the legacy client data into a batch, transforming the batched data based on the script, and loading the transformed data in the data warehouse. Additionally, the batch-driven integrated rules module generally includes a rules database, a rules engine, a script generator and a batch tool, and communicates with at least one other database for creating the script.

16 Claims, 4 Drawing Sheets

METHOD AND SYSTEM OF RESTATING TELECOMMUNICATIONS DATA BY A BATCH-DRIVEN INTEGRATED RULES MODULE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to processing and storing data, and more particularly, but not by way of limitation, to a method and system of restating telecommunications data by a batch-driven integrated rules module.

BACKGROUND OF THE INVENTION

A company may have millions of customers each purchasing a number of different products and/or services. Various business units within the company providing these products and services store data relating to the customer, such as name, address, and billing information. Often, the information in the billing statements is saved for an extended period of time, such as two years. Thus, storing such volumes of data can require large databases.

SUMMARY OF THE INVENTION

One exemplary method of restating telecommunications data by a batch-driven integrated rules module can include receiving batched client data for transforming and loading into a database warehouse to create legacy client data. The method may also include selecting criteria for restating data from a graphic user interface (GUI), communicating the criteria to the batch-driven integrated rules module, generating a script based on the communicated criteria for extracting data from the data warehouse that generally includes the legacy client data, extracting the legacy client data from the data warehouse, queuing the legacy client data into a batch, transforming the batched data based on the script, and loading the transformed data in the data warehouse. Additionally, the batch-driven integrated rules module generally includes a rules database, a rules engine, a script generator, and a batch tool, and communicates with at least one other database for creating the script.

An exemplary system for storing telecommunications data may include a GUI for selecting a business rule, a batch-driven integrated rules module, and a data warehouse. The batch-driven integrated rules module may include a rules database, a rule engine, a batch tool, and a script generator, communicate with the GUI and receive client data for transforming and loading into the data warehouse. The script generator may communicate with at least one database to provide code to generate a script for the selected rule, and the generated script can be loaded in the rules database. The data warehouse can directly or indirectly communicate with the rules database to initiate extracting legacy client data from the data warehouse, batching, transforming, and saving the transformed data in the data warehouse.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

NOTATION AND NOMENCLATURE

Figure 1:
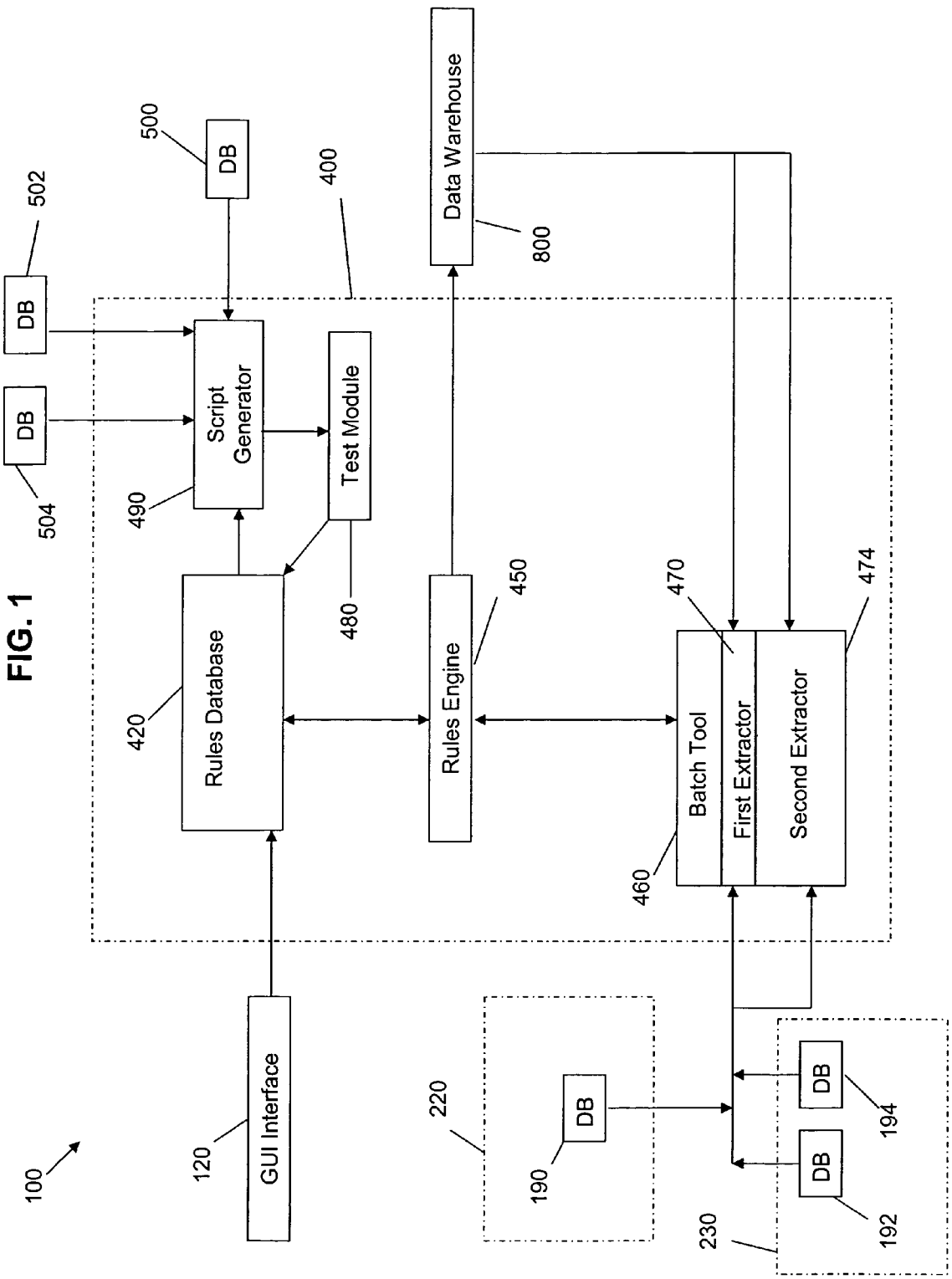
FIG. 1 is a schematic depiction of one exemplary embodiment of a system.

Also in the detailed description and claims which follow, the terms "including" and "comprising" are used in an open-ended fashion, and thus should be interpreted to mean "including, but not limited to . . . ".

The term "couple" or "couples" is intended to mean either an indirect or direct electrical, wireline communicative, or wireless communicative connection. Thus, if a first device couples to a second device, that connection may be through a direct connection, or through an indirect connection via other devices and connections. Items shown or discussed as directly coupled or communicating with each other may be coupled through some interface or device, such that the items may no longer be considered directly coupled to each but may still be indirectly coupled and in communication, whether electrically, mechanically, or otherwise, with one another.

The term "fact" refers to a non-calculated piece of information.

The term "value" refers to calculated information from at least one of one or more facts and one or more values.

The term "data" refers to at least one of a fact and a value.

The term "data warehouse" refers to a collection of data designed to support management decision making. Generally, warehouses include a wide variety of data that present a coherent picture of business conditions at a single point in time in amount of at least one megabyte, desirably at least one gigabyte, and more desirably at least one terabyte.

The term "physical database" refers to a database including at least one of a fact and a value.

The term "rule" refers to an instruction for performing a specific task. A rule may include further sub-rules or details, i.e. one or more instructions for performing the rule.

The term "business rule" refers to logic used to find certain source data for transforming into business information.

The term "script" refers to a list of rules or commands that can be executed without user interaction.

The term "rules database" refers to a database including scripts and codes, and mappings to business rules.

The term "business system" refers to a system or function in a business that has responsibility, e.g. the operation, maintenance or purchase, of one or more business transactions or applications.

The term "business group" refers to a body of persons organized for at least one specific purpose within an organization, i.e. a business group is a subpart of a business.

The term "client data" refers to data received from a business group database, as opposed to the database warehouse.

The term "warehouse data" refers to data retrieved from the database warehouse, and can be formatted as business information.

The abbreviation "GUI" refers to a graphic user interface.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

Often, over time, a business will change the calculation of a value used to depict a particular item or grouping of items in a report or statement. In such instances, it may desirable to retrieve historical data and recalculate the historical values based on the new calculation so trends before and after the calculation change can be compared. While prior systems have practical shortcomings in restating large volumes of data in a timely and efficient manner resulting in such restatements being done over more limited times or not at all, it would be desirable to be able to efficiently and effectively compare current and historical values on an "apples-to-apples" rather than an "apples-to-oranges" basis.

The present system and method allows a business user to select criteria for restating past data or to update client data by a batch-driven integrated rules module. The criteria can include a business rule and its attributes from a graphic user interface (GUI) and the time frame desired for restating the data. This interface, in turn, communicates with a rules database that includes scripts and codes with mappings to business rules. The rules database can utilize waterfall logic, namely a series of iterative look-ups, e.g. tables and conditional logic, to conduct mappings of business rules. If a new or modified business rule is requested by a user, a script generator communicating with the rules database generates a new script based upon the user's request. The script generator can communicate with other databases to pull in the requisite code to build the new script. Afterwards, the new script can be sent to a test module where it is tested before saving in the rules database. Next, client legacy data from the data warehouse can be extracted and queued in a batch. A rules engine can process the batch pursuant to the new script. Once that is done, the transformed batch data can be saved to the data warehouse.

The system and method permits the batch loading of client data and the restating of legacy client data with the same batch-driven integrated rules engine. Moreover, the system and method allows a business user to specify a desired business rule to be applied to a batch of data. The batch-driven integrated rules module can receive a new or modified business rule, and automatically create code or script to implement the new business rule without the intervention of a programmer. Thus, the business group can have possession of their business rules. In addition, the present system and method can process batches of data in amounts, e.g., gigabytes or even terabytes, to allow the restatement of client legacy data to permit the printing of reports to compare the effect of an implementation of a new rule with respect to historical values.

Figure 2:
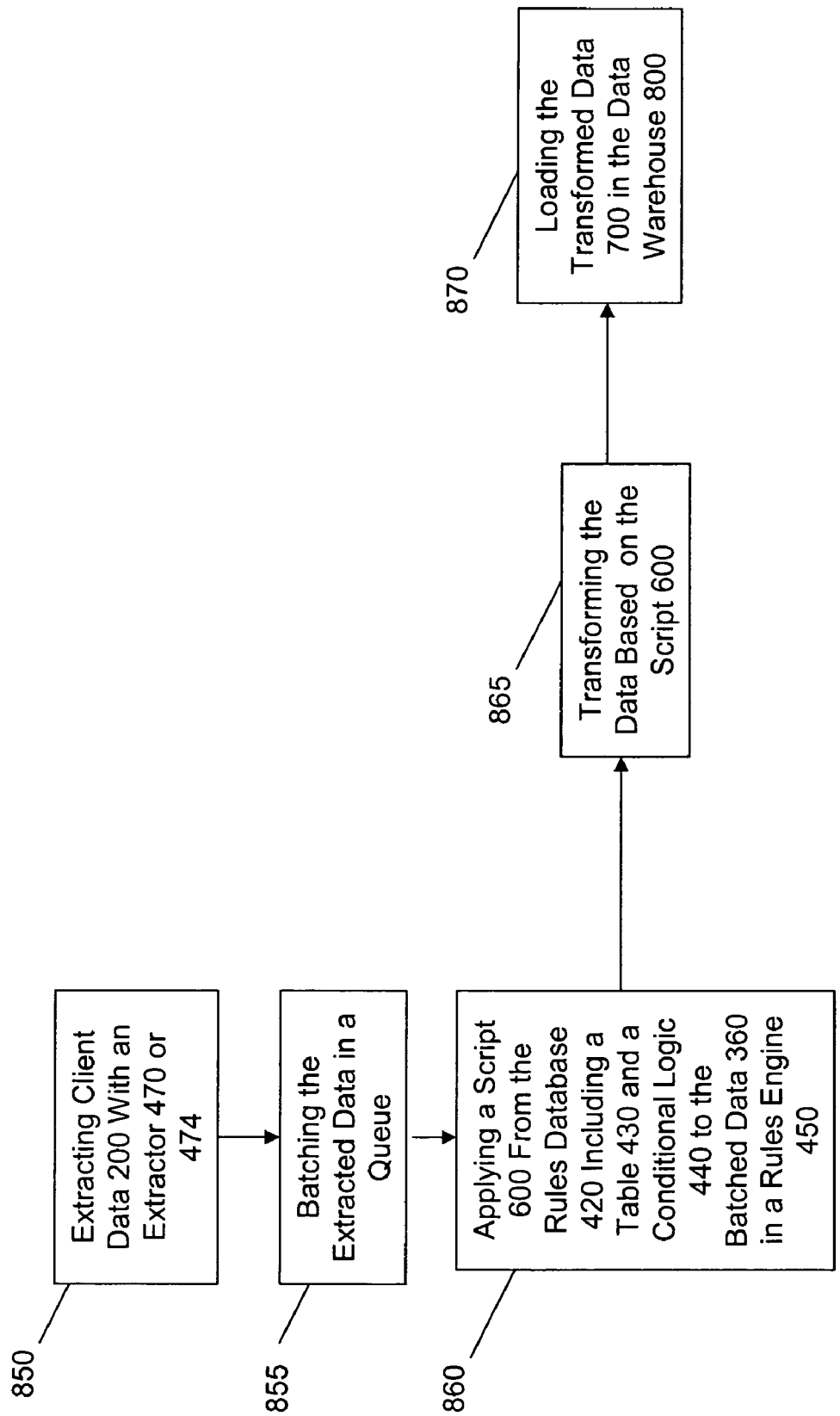
FIG. 2 is a block flow diagram of an exemplary mode of operation for loading client data in a data warehouse.
Figure 3:
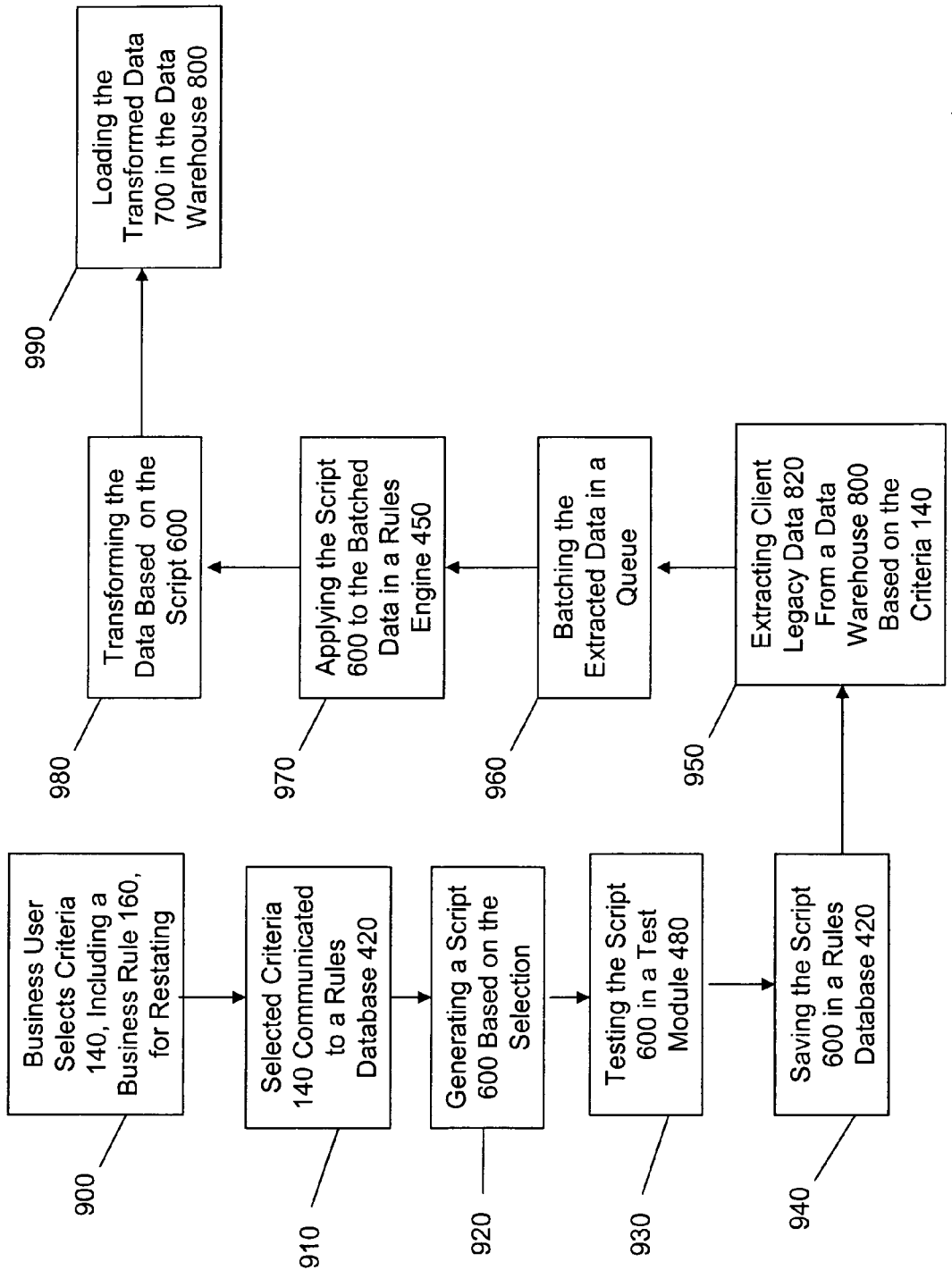
FIG. 3 is a block flow diagram of an exemplary mode of operation for restating data.

Referring to FIGS. 1-3, an exemplary system 100 can include a batch-driven integrated rules module 400 communicating with a GUI 120, business group databases 190, 192, and 194, databases 500, 502, and 504, and a data warehouse 800.

Client data 200 can originate one or more business group databases 190 utilized by a business group 220, and one or more business group databases 192, and 194 utilized by a business group 230. Although three business group databases 190, 192, and 194 are depicted, it should be understood that the client data 200 can originate from a single database or a combination thereof. In addition, any number of business groups 220 and 230 can store data in any number of databases. Moreover, the client data 200 generally includes current data that can be processed through the batch-driven integrated rules module 400, in batches, and stored in the data warehouse 800. The data warehouse 800 includes data from across the business's activities, and generally contains financial data, such as customer billing data. The data in the warehouse 800 can be formatted as business information utilized, e.g., by a business group. The data warehouse 800 can store at least a megabyte of data, preferably at least a gigabyte of data, and most preferably at least a terabyte of data. The databases 500, 502, and 504 provide sources of code and script for the batch-driven integrated rules module 400, as hereinafter described.

The GUI 120 permits a user to create, update, maintain or modify business rules 160, and to request restatements of client legacy data 820. The user can make these requests by specifying criteria 140 that includes the new or modified rule, specific data subject to the new rule, and the time frame subject to restatement. Thus, the user can define the rule. The criteria 140 can include single look-up logic stored in business run tables tailored to single look-up dimensions, which in turn look-up on multiple fields. As an example, a user can select a business rule 160 in table depicted in the GUI 120. The business rule 160 can have default attributes, or the user can scroll through tables of attributes and make selections to modify the business rule 160. In addition, the user can create a new business rule 160 by selecting a title for a business rule 160, and then selecting the desired attributes from one or more tables. The time frames selected by a user can be anywhere from 1 to 2 weeks, to 3 to 6 months, or even 2 to 4 years, although other time frames are also contemplated. The limitation on such a restatement can be the length of time that data is saved to the data warehouse 800. Such data typically relates to financial data, such as account receivables, account payables, inventory costs, profit and loss categories, ledger codes, and billing cycles. But the data can also include customer information, e.g., address, phone number, and email address, customer changes, credit class codes, sales channel, types of calls, call region, logistics, inventory, etc.

The batch-driven integrated rules module 400 can include a rules database 420, a rules engine 450, a batch tool 460, a test module 480, and a script generator 490. The rules database 420 utilizes a waterfall dimension, which is a collection of look-up tables 430 and conditional logic 440 in a defined sequence that provides mappings to business rules 160. Each look-up can be defined by looking up one or more consolidated model attribute values, one specific supplied value or a pre-defined list of values, which may or may not be an external table, feed, or list of data. If a first look-up does not return a value, then a subsequent rule will be performed. Once a value is returned, the look-up process stops. The value must exist in a list of valid values for the returned value to be accepted. The collection of tables 430 can include columns of business rules 160 mapped to other tables, values, and conditional logic 440, such as if-then-else statements, to modify the business rule 160 selected by a user. The table of business rules 160 can include further details, e.g. sub-rules. The rules database 420 may also include a process table, which generally includes a collection of rules. The process table can associate a rule with other related rules to provide the proper context for generating a script 600. The process table may also facilitate the updating of the client data 200.

The script generator 490 utilizes the mappings of the rules database 420 to generate the script 600 for the desired business rule 160. The script generator 490 communicates with the rules database 420 as well as other databases 500, 502, and 504 based on the mappings created at the rules database 420. The script generator 490 can compile the script 600 with code provided in the rules database 420 or other databases 500, 502, or 504. Although three databases 500, 502, and 504 are depicted, it should be understood that any number of these databases can be utilized. Alternatively, in another exemplary embodiment, none of these databases 500, 502, and 504 may communicate with the script generator 490. Rather, all the requisite information can be provided by the rules database 420.

The script generator 490 can access tables, create temporary tables, and pull columns from source tables to write the script 600. The tables may be populated with source application data. Thus, code for an existing business rule 160 can be modified by appending other code from one or more of the databases 500, 502, and 504 via the mappings created in the rules database 420. Alternatively, new code can be generated for a new business rule 160 by the same process described above.

The test module 480 allows testing of the new script 600 before saving to the rules database 420. Thus, the new script 600 can be evaluated to ensure its proper operation, capability with other systems, and output to verify that the script 600 as created performs as designed. Also, the new script 600 can be sampled to be approved, as well as the entire script 600. Afterwards, once the script 600 is approved, the script 600 may be saved in the rules database 420.

The criteria 140 can include a request to pull specific data in a given time frame for restatement. As such, such a request can be received at the batch tool 460. The batch tool 460 can include a first extractor 470 and a second extractor 474. The extractors 470 and 474 can retrieve data, desirably in batches, from either the business group databases 190, 192 and 194 or the data warehouse 800. Generally, the first extractor 470 handles a lower volume of data traffic, such as no more than 300 gigabyte and the second extractor 474 handles a greater volume of data traffic, such as more than 300 gigabyte. Thus, the extractors 470 and 474 can receive new data from business group databases 190, 192, and 194 or client legacy data 820 from the data warehouse 800. Except for billing data that may be retrieved by the second extractor 474, generally client data 200 can be received in the first extractor 470. Generally, the client legacy data 820 can be received by the second extractor 474, due to the volume of data traffic required for restating, however, a smaller volume of data traffic can be received by the first extractor 470. After the data is extracted, the batch tool 460 can queue the data in a batch 360 for processing by the rules engine 450.

The rules engine 450 communicates with the rules database 420 to apply the script 600 to the batch 360. The rules engine 450 can process client data 200 that has not been previously saved to the data warehouse 800, and client legacy data 820 that has been saved to the data warehouse 800. In either instance, the data warehouse 800 can update client data 200 and restate client legacy data 820. The rules engine 450 produces an ANSI SQL statement to run and execute the extraction of data by the batch tool 460 and send the transformed data 700 to the data warehouse 800, which has been described above. Alternatively, the rules engine 450 can be integrated with the data warehouse 800 for restating information.

Referring to FIG. 2, an exemplary operation is depicted for saving client data 200 to the data warehouse 800. Generally, daily updates of business data can be processed and stored as business information in the data warehouse 800. In this operation, client data 200 from business group databases 190, 192 and/or 194 is subject to an existing script 600 from the rules database 420 and saved in the data warehouse 800. In this operation, client data 200 from the business group databases 190, 192, and/or 194 is extracted with an extractor 470 or 474, depending on the traffic volume at a block 850. A small volume of data, e.g., not more than 300 gigabyte, can be extracted with the first extractor 470. A large volume of data, e.g., more than 300 gigabyte, such as billing data, may be extracted with the second extractor 474. The batch tool 460 can batch the extracted data in a queue at a block 855. Afterwards, the rules engine 450 applies a script 600 already saved in the rules database 420 to transform the batched data at a block 860. The chosen script 600 can be communicated to the rules database 420 when the client data 200 is extracted. This transformed data 700 can be presented as a result table. Next, the data is batched and transformed at a block 865. That being done, the transformed data 700 can be loaded in the data warehouse 800 as business information at a block 870.

Referring to FIG. 3, an exemplary operation is depicted for restating data. At a first block 900, a business user can select criteria 140 for restatement. The criteria 140 can include the type of data to be restated, a time frame, and the attributes of a new business rule 160 to be implemented. With respect to the type of data, the data can be, e.g., a new treatment for a group of customers. As an example, a group of customers can be segmented, i.e. owned by a given business group within the company, such as a consumer group, a home office group, and a business group. This customer group segment can be changed, e.g., from the consumer group to the home office group. As such, a business user can change a business rule 160 in a GUI 120 to change a business rule and associated details reflecting the treatment of this group. These selected criteria 140 can be communicated to a rules database 420 at a block 910. Generally, the rules database 420 includes mappings for generating a new or modified business rule 160 based on the choices made by the business users. Also, the script generator 490 can generate a script 600 at a block 920, and optionally test at the test module 480 at a block 930. Once verified, and the script 600 can be saved in the rules database 420 at a block 940. In addition, the type of data and timeframe can be communicated to the batch tool 460 for extracting client legacy data 820 from the data warehouse 800 at a block 950, and the extracted client legacy data 820 can be queued in a batch 360 at a block 960. Afterwards, the script 600 can be applied to the batched data in the rules engine 450 at a block 970, the batched data is transformed based by the script 600 at a block 980, and then the transformed data 700 is loaded in the data warehouse 800 as business information at a block 990. In addition, the business information can be displayed as a historical view of information subject to the new script, the client data 200 can be displayed as a current view of client data subject to the new script, or a combination thereof. Alternatively, the transformed data 700 can be processed by the rules engine 450, but not saved to the data warehouse 800 as business information, particularly if the restating process is being tested.

Figure 4:
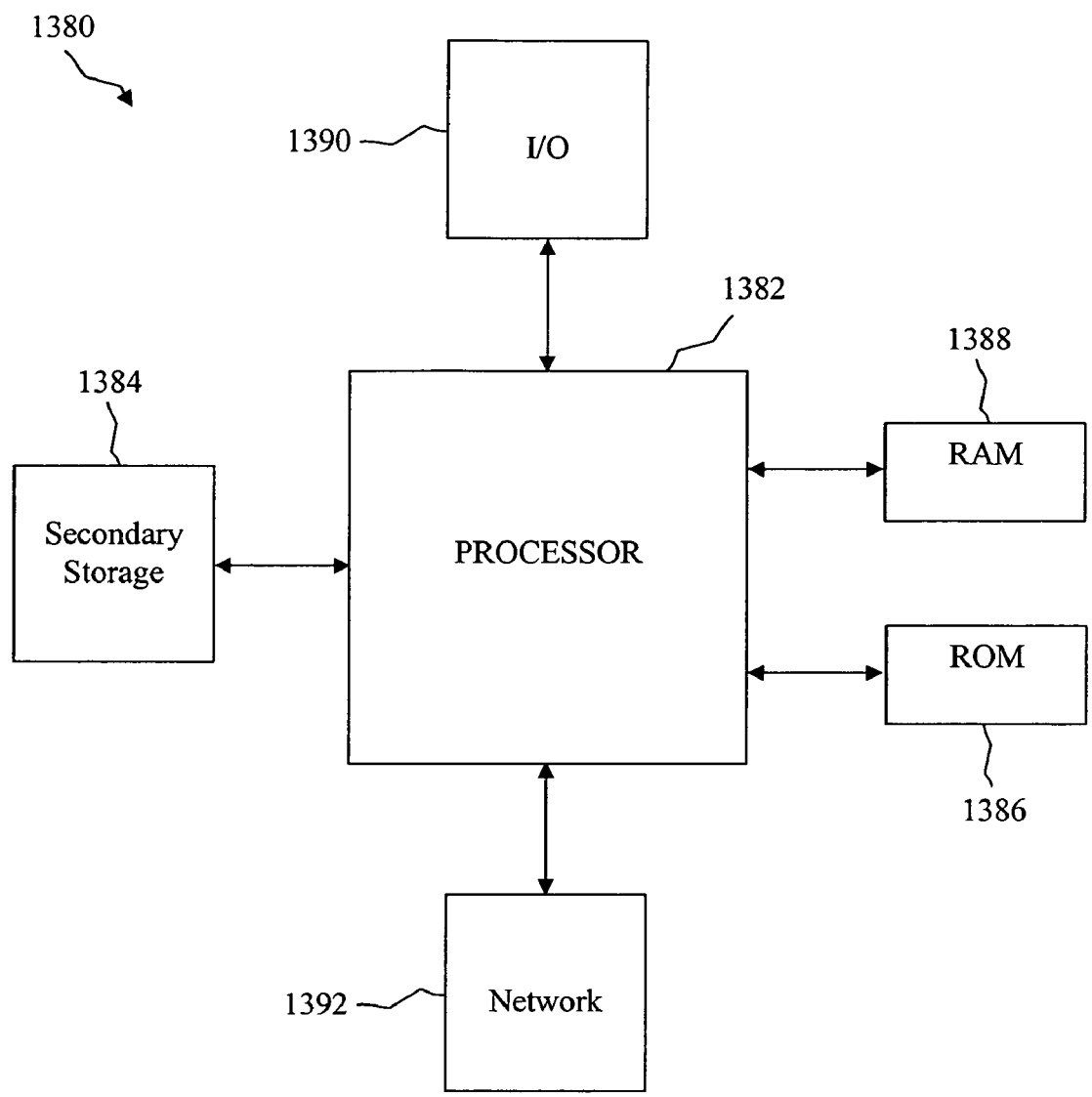
FIG. 4 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 4 illustrates a typical, general-purpose computer system suitable for implementing one or more embodiments disclosed herein. The computer system 1380 includes a processor 1382 (which may be referred to as a central processor unit or CPU) that is in communication with memory devices including a secondary storage 1384, a read only memory (ROM) 1386, a random access memory (RAM) 1388, an input/output (I/O) devices 1390, and a network connectivity devices 1392. The processor may be implemented as one or more CPU chips.

The secondary storage 1384 is typically comprised of one or more disk drives or tape drives and is used for non-volatile storage of data and as an over-flow data storage device if the RAM 1388 is not large enough to hold all working data. The secondary storage 1384 may be used to store programs which are loaded into the RAM 1388 when such programs are selected for execution. The ROM 1386 is used to store instructions and perhaps data which are read during program execution. The ROM 1386 is a non-volatile memory device which typically has a small memory capacity relative to the larger memory capacity of secondary storage 1384. The RAM 1388 is used to store volatile data and perhaps to store instructions. Access to both the ROM 1386 and RAM 1388 is typically faster than to the secondary storage 1384.

The I/O devices 1390 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 1392 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 1392 may enable the processor 1382 to communicate with an Internet or one or more intranets. With such a network connection, it is contemplated that the processor 1382 might receive information from the network, or might output information to the network in the course of performing the above-described method steps. Such information, which is often represented as a sequence of instructions to be executed using the processor 1382, may be received from and outputted to the network, for example, in the form of a computer data signal embodied in a carrier wave.

Such information, which may include data or instructions to be executed using the processor 1382 for example, may be received from and outputted to the network, for example, in the form of a computer data baseband signal or signal embodied in a carrier wave. The baseband signal or signal embodied in the carrier wave generated by the network connectivity 1392 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 1382 executes instructions, codes, computer programs, scripts which it accesses from hard disk, floppy disk, optical disk (these various disk based systems may all be considered the secondary storage 1384), the ROM 1386, the RAM 1388, or the network connectivity devices 1392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A method of restating telecommunications data by a batch-driven integrated rules module that receives batched client data, comprising:

selecting a set of criteria for restating data from a Graphic User Interface (GUI), the set of criteria includes attributes of a business rule to be applied for restating the data;

communicating the set of criteria to the batch-driven integrated rules module wherein the batch-driven integrated rules module comprises a rules database and a script generator;

mapping the attributes of the business rule in the communicated set of criteria to rules in the rules database by iteratively utilizing a collection of look-up tables and conditional logic in the rules database;

automatically generating a script by the script generator of the batch-driven integrated rules module by communicating with the rules database and compiling the rules in the rules database that were mapped to the attributes of the business rule;

extracting data from a data warehouse based on the generated script, the data comprises legacy client data;

queuing the legacy client data into a batch;

transforming the batched legacy client data based on the generated script; and loading the transformed legacy client data in the data warehouse.

2. The method according to claim 1, wherein the data warehouse comprises at least a gigabyte of data.

3. The method according to claim 1, wherein the data warehouse comprises at least a terabyte of data.

4. The method according to claim 1, wherein the extracted data comprises at least a gigabyte of data.

5. The method according to claim 1, wherein the extracted data comprises at least a terabyte of data.

6. The method according to claim 1, wherein the telecommunications data comprises customer billing data.

7. The method according to claim 1, wherein the batch-driven integrated rules module further comprises a batch tool, and wherein the batch tool comprises a first extractor, the first extractor extracts data in amount of no more than 300 gigabyte and a second extractor, the second extractor extracts data in amount of more than 300 gigabyte.

8. The method according to claim 1, further comprising testing the script and loading the script in the rules database before extracting data from the data warehouse.

9. A system for storing telecommunications data, comprising:
- a computer system that implements a Graphic User Interface (GUI), the GUI provides selection of a set of criteria, the selected set of criteria includes attributes of a business rule;
- a computer-readable storage medium that stores a data warehouse, the data warehouse including client data; and
- a computer-readable storage medium that stores a batch-driven integrated rules module, the batch-driven integrated rules module communicates with the GUI and receives the selected set of criteria, the batch-driven integrated rules module comprises:
  - a rules database that maps the attributes of the selected set of criteria to rules in the rules database, the rules database iteratively utilizes a collection of look-up tables and conditional logic to map the attributes of the selected set of criteria to the rules in the rules database;
  - a script generator that communicates with the rules database and compiles code from the rules in the rules database that were mapped to by the rules database to automatically generate a script for the business rule, and the generated script is loaded in the rules database;
  - a batch tool that extracts the client data from the data warehouse into a batch; and
  - a rules engine that applies the script to the batch to transform the client data according to the business rule, the rules engine further saves the transformed client data into the data warehouse.

10. The system according to claim 9, wherein the data warehouse comprises at least a terabyte of data.

11. The system according to claim 9, wherein the extracted data comprises at least a gigabyte of data.

12. The system according to claim 9, wherein the extracted data comprises at least a terabyte of data.

13. The system according to claim 9, wherein the batch tool comprises a first extractor, the first extractor extracts data in amount of no more than 300 gigabyte and a second extractor, the second extractor extracts data in amount of more than 300 gigabyte.

14. The method system according to claim 9, wherein the rules engine transforms both client data from a business group and the client data from the data warehouse.

15. The method according to claim 1, wherein the criteria includes default attributes of the business rule.

16. The system according to claim 9, wherein the criteria includes default attributes of the business rule.

* * * * *